(12) United States Patent
Amittai et al.

(10) Patent No.: US 11,151,578 B2
(45) Date of Patent: Oct. 19, 2021

(54) METHODS AND SYSTEMS FOR PROCESSING CUSTOMER INQUIRIES

(71) Applicant: BEIJING DIDI INFINITY TECHNOLOGY AND DEVELOPMENT CO., LTD., Beijing (CN)

(72) Inventors: Axelrod Amittai, Mountain View, CA (US); Kevin Knight, Mountain View, CA (US)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 200 days.

(21) Appl. No.: 16/237,096

(22) Filed: Dec. 31, 2018

(65) Prior Publication Data
US 2020/0211030 A1    Jul. 2, 2020

(51) Int. Cl.
*G06Q 30/00* (2012.01)
*G06F 40/35* (2020.01)
*G06F 40/289* (2020.01)

(52) U.S. Cl.
CPC ......... *G06Q 30/016* (2013.01); *G06F 40/289* (2020.01); *G06F 40/35* (2020.01)

(58) Field of Classification Search
None
See application file for complete search history.

(56) References Cited

U.S. PATENT DOCUMENTS

| 8,694,304 B2 * | 4/2014 | Larcheveque | G06F 16/355 704/9 |
| 8,732,023 B2 | 5/2014 | Mikurak | |
| 2003/0185379 A1 * | 10/2003 | O'Connor | H04L 51/14 379/265.02 |
| 2003/0204435 A1 * | 10/2003 | McQuilkin | G06Q 30/02 705/7.32 |

(Continued)

OTHER PUBLICATIONS

International Search Report and Written Opinion issued in International Application No. PCT/US 18/68199, dated Apr. 12, 2019, 13 pages.

*Primary Examiner* — Dennis W Ruhl
*Assistant Examiner* — Donald J Edmonds
(74) *Attorney, Agent, or Firm* — Finnegan, Henderson, Farabow, Garrett & Dunner LLP

(57) ABSTRACT

Embodiments of the disclosure provide a method and system for processing a customer inquiry. The method includes obtaining multiple conversations. Each of the conversations includes multiple conversation entries associated with the conversation. The method also includes, for each of the conversations, generating a directed path from a start to an end of the historical conversation. The directed path includes multiple edges and vertices. Each of the edges represents a conversation entry or an API call associated with the conversation, and each of the vertices represents a state of the conversation. The method further includes generating a directed graph based on the generated directed paths and determining an optimized directed path based on the directed graph. The method also includes receiving a customer inquiry from a user device associated with a customer, and generating a response based on the optimized directed path.

19 Claims, 7 Drawing Sheets

(56) References Cited

U.S. PATENT DOCUMENTS

| | | | | |
|---|---|---|---|---|
| 2005/0105712 A1* | 5/2005 | Williams | ............ | H04M 3/5166 379/265.02 |
| 2011/0238410 A1* | 9/2011 | Larcheveque | ........ | G06F 16/355 704/9 |
| 2014/0161241 A1* | 6/2014 | Baranovsky | ........ | H04M 3/5232 379/142.05 |
| 2014/0173078 A1* | 6/2014 | McCord | ................. | G06Q 30/01 709/223 |
| 2014/0207441 A1* | 7/2014 | Larcheveque | .......... | G06F 40/30 704/9 |
| 2014/0279718 A1* | 9/2014 | Southey | .................. | G06N 5/04 706/11 |
| 2014/0314225 A1* | 10/2014 | Riahi | .................. | H04M 3/5183 379/265.09 |
| 2016/0078348 A1* | 3/2016 | Finch | ...................... | G06N 5/04 706/12 |
| 2016/0337516 A1* | 11/2016 | Runyan | ............. | H04M 3/42263 |
| 2016/0342702 A1* | 11/2016 | Barve | ................. | G06F 16/2457 |
| 2017/0262755 A1* | 9/2017 | Takeuchi | ............... | G06N 5/022 |
| 2018/0365228 A1* | 12/2018 | Galitsky | ............... | G06N 5/022 |

\* cited by examiner

METHODS AND SYSTEMS FOR PROCESSING CUSTOMER INQUIRIES

TECHNICAL FIELD

The present disclosure relates to processing customer inquiries, and more specifically relates to generating a directed graph based on historical conversations between customers and agents to process new customer inquiries according to natural language processing (NLP).

BACKGROUND

Customers often seek assistance with products or services from a company providing the products or services. For example, a customer who needs technical support on how to use a product may call a customer service number and seek help from the company. The company may provide a customer service system to accommodate the customer's need. For instance, the company may have a group of agents to interact with customers via interactive voice response systems. However, these existing systems have significant drawbacks. For example, a customer may have to wait for a long period of time before being transferred to an agent, given the capacity of the customer service system and the number of customers being waiting. As another example, even when a customer gets to speak with an agent, the agent may not have the knowledge to address the customer's need, which wastes not only the customer's time but also the company's resources. It is desirable to provide systems and methods for processing customer inquiries more efficiently and more effectively.

SUMMARY

Embodiments of the disclosure provide a computer-implemented method for processing customer inquiries. The method includes obtaining a plurality of historical conversations. Each of the historical conversations includes a plurality of conversation entries associated with the each of the historical conversations. The method also includes, for each of the historical conversations, generating a directed path from a start to an end of the each of the historical conversations. The directed path includes a plurality of edges and a plurality of vertices. Each of the edges represents a conversation entry or an application program interface (API) call associated with the each of the historical conversations, and each of the vertices represents a state of the each of the historical conversations. The method further includes generating a directed graph based on the generated directed paths and determining an optimized directed path based on the directed graph. The optimized directed path includes a plurality of edges and a plurality of vertices. The method also includes receiving a customer inquiry from a user device associated with a customer, and generating a response in response to the received customer inquiry based on the optimized directed path.

Embodiments of the disclosure further disclose a system for processing a customer inquiry. The system includes one or more processors and one or more data storage devices storing instructions that, when executed, cause the one or more processors to perform operations including obtaining a plurality of historical conversations. Each of the historical conversations includes a plurality of conversation entries associated with the each of the historical conversations. The operations also include, for each of the historical conversations, generating a directed path from a start to an end of the each of the historical conversations. The directed path includes a plurality of edges and a plurality of vertices. Each of the edges represents a conversation entry or an API call associated with the each of the historical conversations, and each of the vertices represents a state of the each of the historical conversations. The operations further include generating a directed graph based on the generated directed paths and determining an optimized directed path based on the directed graph. The optimized directed path includes a plurality of edges and a plurality of vertices. The operations also include receiving a customer inquiry from a user device associated with a customer, and generating a response in response to the received customer inquiry based on the optimized directed path.

Embodiments of the disclosure further disclose a non-transitory computer-readable medium storing instructions. When executed, the instructions cause one or more processors to perform operations including obtaining a plurality of historical conversations. Each of the historical conversations includes a plurality of conversation entries associated with the each of the historical conversations. The operations also include, for each of the historical conversations, generating a directed path from a start to an end of the each of the historical conversations. The directed path includes a plurality of edges and a plurality of vertices. Each of the edges represents a conversation entry or an API call of the each of the historical conversations, and each of the vertices represents a state of the each of the historical conversations. The operations further include generating a directed graph based on the generated directed paths and determining an optimized directed path based on the directed graph. The optimized directed path includes a plurality of edges and a plurality of vertices. The operations also include receiving a customer inquiry from a user device associated with a customer, and generating a response in response to the received customer inquiry based on the optimized directed path.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

An aspect of the disclosure is directed to a system for processing customer inquiries. The system may obtain a plurality of conversations between customers and agents and generate a directed graph based on the conversations. In some embodiments, the directed graph may include a directed acyclic graph. The system may also generate one or more responses to a new customer inquiry based on the directed graph.

Figure 1:
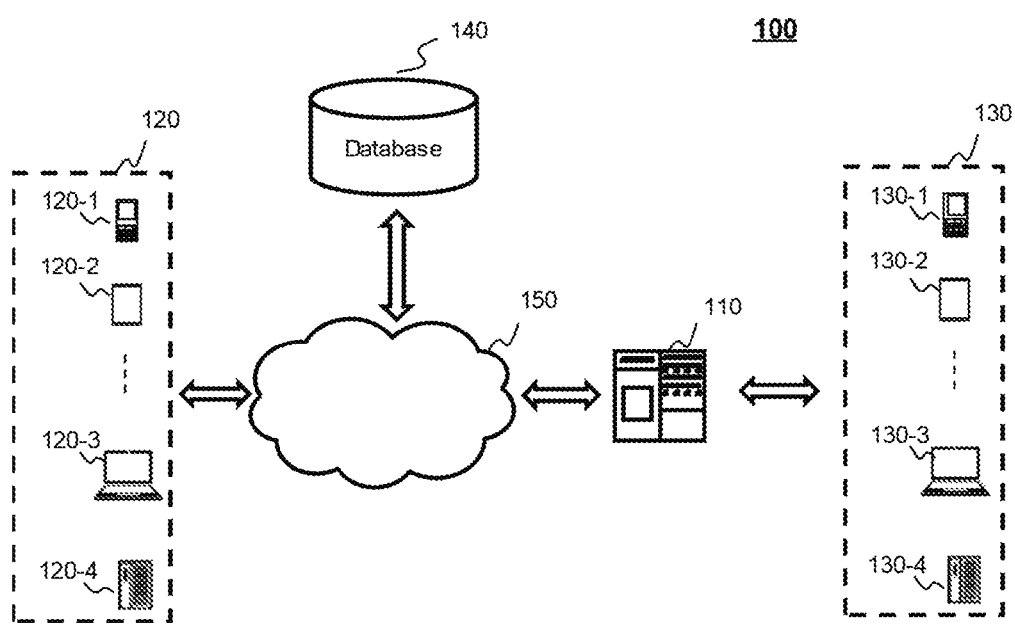
FIG. 1 illustrates a schematic diagram of an exemplary system for processing customer inquiries, in accordance with some embodiments of this disclosure.

FIG. 1 is a diagram illustrating an exemplary system 100 for processing customer inquiries. As illustrated in FIG. 1, system 100 may include a server 110, one or more user devices 120, one or more agent devices 130, a database 140, and a network 150.

A customer may transmit an inquiry for support to server 110 via a user device 120 associated with the customer. For example, a customer may initiate an online chat using a chat box on a support website associated with server 110. The customer may also receive one or more responses from an agent (via, e.g., agent device 130).

In some embodiments, user device 120 associated with a customer may include a mobile device 120-1, a tablet computer 120-2, a laptop computer 120-3, a built-in device in a vehicle 120-4, a landline phone, or the like, or any combination thereof. In some embodiments, mobile device 120-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glasses, a smart helmet, a smartwatch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift, a HoloLens, a Gear VR, etc. In some embodiments, user device 120 may include a device with positioning technology (e.g., global positioning system or GPS) for locating the position of the customer and/or user device 120.

An agent may interact with the customer via agent device 130. For example, server 110 may forward a customer inquiry to agent device 130 associated with a human agent. The agent may respond to the customer via agent device 130. As another example, an agent interacting with the customer may include an automated virtual agent (also referred to herein as a "bot"). Agent device 130 may generate responses and/or take actions relating to the customer inquiry. For example, agent device 130 may execute an application program interface (API) call to update a customer's phone number based on the customer's request. In some embodiments, agent device 130 may include a mobile device 130-1, a tablet computer 130-2, a laptop computer 130-3, a built-in device in a vehicle 130-4, a landline phone, or the like, any combination thereof. In some embodiments, mobile device 130-1 may include a smart device, a wearable device, a virtual reality device, an augmented reality device, or the like, or any combination thereof. In some embodiments, agent device 130 may include a device with positioning technology (e.g., global positioning system or GPS) for locating the position of the agent and/or agent device 130.

In some embodiments, agent device 130 may provide an application programming interface (API) through which an agent (a bot and/or human agent) may retrieve information and take actions in response to a customer's inquiry. For example, a customer may transmit an inquiry to update the phone number of record to server 110, which may forward the inquiry to agent device 130. Agent device 130 may retrieve the profile information of the customer based on the inquiry through the API (e.g., via a getUserInfo( ) call). Agent device 130 may also receive further information from the customer by interacting with the customer and update the phone number via an operation API call (e.g., via updatePhoneNumber( ) call). In some embodiments, API calls may include operations that enable an agent's application to invoke at runtime to take specific actions. Exemplary actions include querying data, adding, updating, and deleting, processing data (e.g., information relating to customers, company, third-parties, or the like, or a combination thereof).

In some embodiments, the agent involved in the conversation with the customer may include a human agent (real-time or off-line), an automated virtual agent (also referred to herein as "bot"), or the like, or a combination thereof. For example, a customer may initiate an online chat (i.e., a conversation) using a chat box on a customer support website. A bot may interact with the customer through a customer inquiry processing model. The bot may receive information relating to the inquiry of the customer and provide a potential solution to the customer. System 100 may also determine whether the bot can provide a satisfactory solution to the customer and if not, system 100 sends a request for a human agent to get involved in the conversation.

Database 140 or other external storage may include a volatile or non-volatile, magnetic, semiconductor, tape, optical, removable, non-removable, or another type of storage device or tangible or non-transitory computer-readable medium. Memory 220 and database 140 may include one or more memory devices that store data and instructions used to perform one or more features of the disclosed embodiments. Memory 220 and database 140 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

Network 150 may facilitate the exchange of information and/or data. In some embodiments, one or more components of system 100 (e.g., server 110, user device 120, agent device 130, database 140, etc.) may transmit information and/or data to another component (s) of system 100 via network 150. For example, server 110 may receive an inquiry from a user device 120 associated with a customer via network 150. In some embodiments, network 150 may be any type of wired or wireless network, or combination thereof. Merely by way of example, network 150 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, network 150 may include one or more network access points. For example, network 150 may include wired or wireless network access points, through which system 100 may be connected to network 150 to exchange data.

Figure 2:
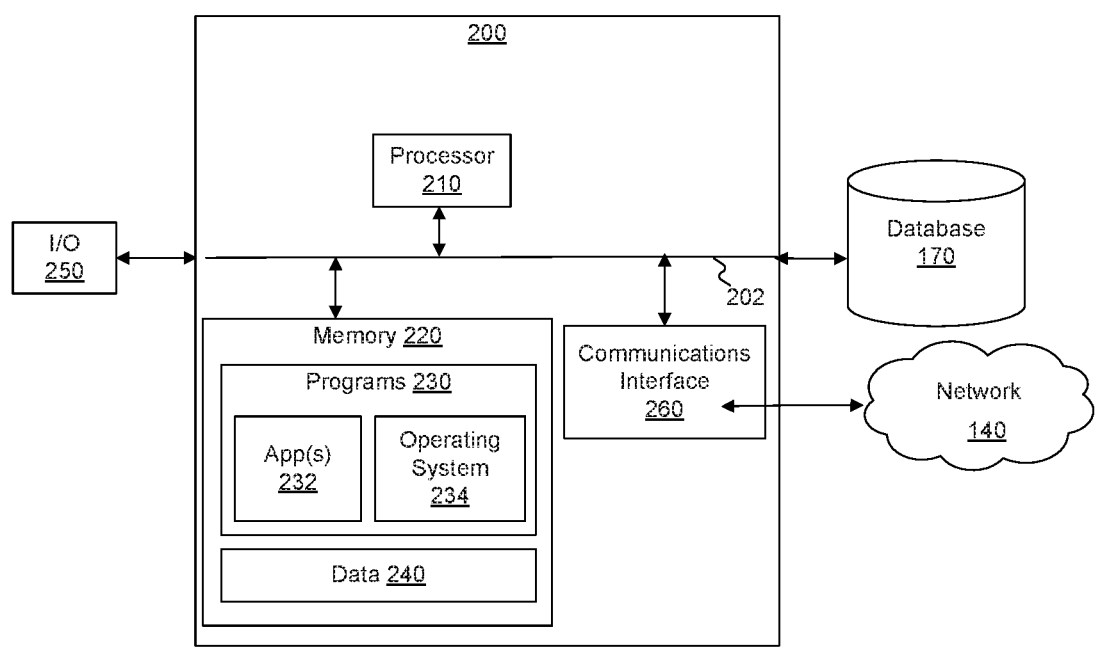
FIG. 2 illustrates a schematic diagram of an exemplary computing device, in accordance with some embodiments of this disclosure.

FIG. 2 is a diagram illustrating the components of an exemplary computing device 200 configured to perform methods or processes provided in embodiments of the present disclosure. For example, server 110, user device 120, and/or agent device 130 may be implemented using architecture and components of computing device 200. Computing device 200 may be configured to perform process 500, or 700, a combination thereof.

As shown in FIG. 2, computing device 200 may include a bus 202 (or other communication mechanisms), which interconnects subsystems and components for transferring information within computing device 200. Computing device 200 may also include one or more processors 210, one or more memories 220 storing programs 230 including, for example, app(s) 232, operating system 234, and data 240, and a communications interface 260 (e.g., a modem, Ethernet card, or any other interface configured to exchange data with a network, such as network 150 in FIG. 1). Computing device 200 may communicate with an external database 140 (which, for some embodiments, may be included within computing device 200).

In some embodiments, computing device 200 may include a single server (e.g., computing device 200) or may be configured as a distributed computer system including multiple servers, server farms, clouds, or computers that interoperate to perform one or more of the processes and functionalities associated with the disclosed embodiments. The term "cloud server" refers to a computer platform that provides services via a network, such as the Internet. When computing device 200 is a cloud server it may use virtual machines that may not correspond to individual hardware. Specifically, computational and/or storage capabilities may be implemented by allocating appropriate portions of desirable computation/storage power from a scalable repository, such as a data center or a distributed computing environment.

Processor 210 may be one or more processing devices configured to perform functions of the disclosed methods, such as a microprocessor manufactured by Intel™ or manufactured by AMD™. Processor 210 may comprise a single core or multiple core processors executing parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other technologies to provide the ability to execute, control, run, manipulate, store, etc. multiple software processes, applications, programs, etc. In some embodiments, processor 210 may include a multiple-core processor arrangement (e.g., dual, quad-core, etc.) configured to provide parallel processing functionalities to allow computing device 200 to execute multiple processes simultaneously. It is appreciated that other types of processor arrangements could be implemented that provide for the capabilities disclosed herein.

Memory 220 may be a volatile or non-volatile, magnetic, semiconductor, tape, optical, removable, non-removable, or another type of storage device or tangible or non-transitory computer-readable medium that stores one or more program(s) 230 such as apps 232 and operating system 234, and data 240. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Computing device 200 may include one or more storage devices configured to store information used by processor 210 (or other components) to perform certain functions related to the disclosed embodiments. For example, computing device 200 may include memory 220 that includes instructions to enable processor 210 to execute one or more applications, such as apps 232, operating system 234, and any other type of application or software known to be available on computer systems. Alternatively or additionally, the instructions, application programs, etc., may be stored in an external database 140 (which can also be internal to computing device 200) or external storage communicatively coupled with computing device 200 (not shown), such as one or more database or memory accessible over network 150.

In some embodiments, computing device 200 may be communicatively connected to one or more remote memory devices (e.g., remote databases (not shown)) through network 150 or a different network. The remote memory devices can be configured to store information that computing device 200 can access and/or manage. By way of example, the remote memory devices may include document management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 230 may include one or more software modules causing processor 210 to perform one or more functions of the disclosed embodiments. Moreover, processor 210 may execute one or more programs located remotely from one or more components of system 100. For example, computing device 200 may access one or more remote programs that, when executed, perform functions related to disclosed embodiments.

In the presently described embodiment, app(s) 232 may cause processor 210 to perform one or more functions of the disclosed methods. For example, a customer may initiate a conversation with an agent via an application installed on a mobile phone (i.e., a user device 120).

In some embodiments, program(s) 230 may include operating system 234 performing operating system functions when executed by one or more processors such as processor 210. By way of example, operating system 234 may include Microsoft Windows™, Unix™, Linux™, Apple™ operating systems, Personal Digital Assistant (PDA) type operating systems, such as Apple iOS, Google Android, Blackberry OS, Microsoft CE™, or other types of operating systems. Accordingly, the disclosed embodiments may operate and function with computer systems running any type of operating system 234. Computing device 200 may also include software that, when executed by a processor, provides communications with network 150 through communications interface 260 and/or a direct connection to one or more user devices 120.

In some embodiments, data 240 may include, for example, profiles of users, account information of users, profiles of agents, knowledge database, information relating to the previous inquiries of users, or the like, or a combination thereof.

Computing device 200 may also include one or more I/O devices 250 having one or more interfaces for receiving signals or input from devices and providing signals or output to one or more devices that allow data to be received and/or transmitted by computing device 200. For example, computing device 200 may include interface components for interfacing with one or more input devices, such as one or more keyboards, mouse devices, and the like.

Figure 3:
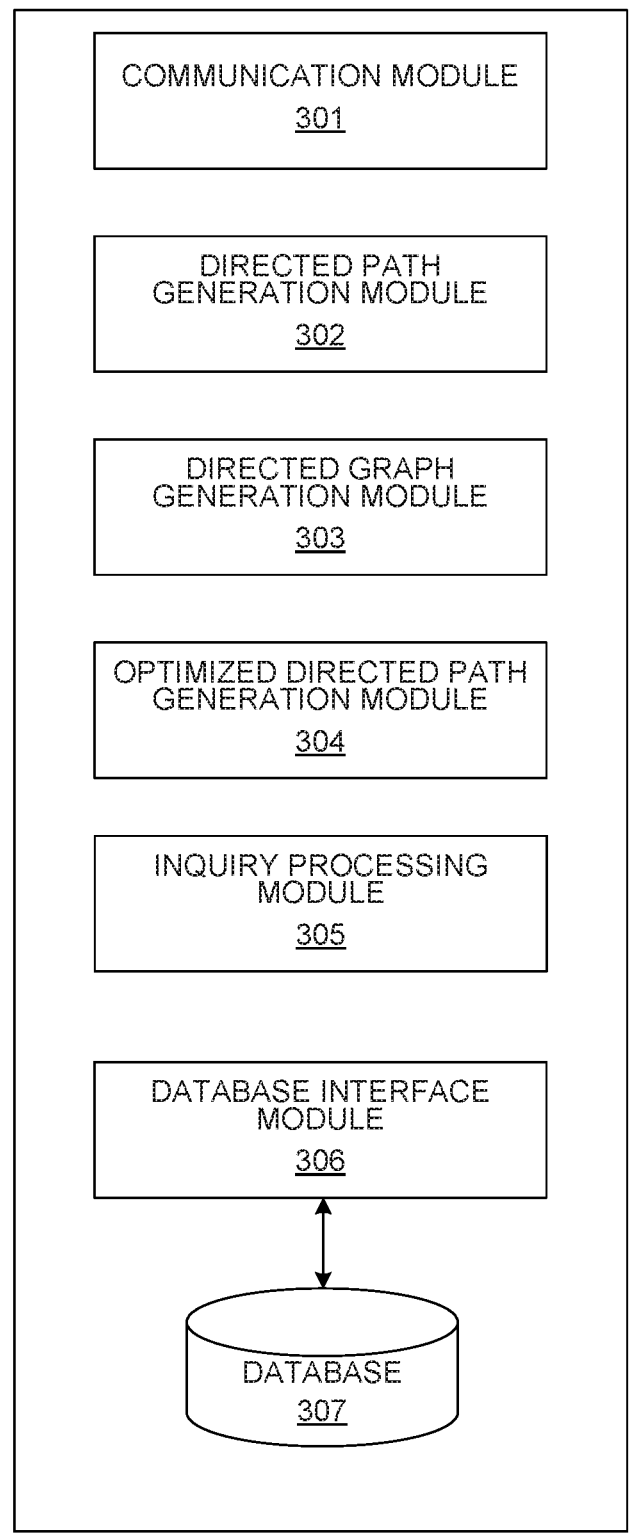
FIG. 3 illustrates a schematic diagram of an exemplary memory module for processing a customer inquiry, in accordance with some embodiments of this disclosure.

FIG. 3 depicts an embodiment of memory module 300 for processing a customer inquiry, in accordance with some embodiments of the present disclosure. Memory module 300 may be implemented in memory 220 illustrated in FIG. 2. Memory module 300 may store a plurality of modules and may be executable by at least one processor to perform various methods and processes disclosed herein. Further, it should be noted that memory module 300 may store more or fewer modules than those shown in FIG. 3, depending on implementation-specific considerations.

As illustrated in FIG. 3, memory module 300 may store software instructions to execute a communication module 301, a directed path generation module 302, a directed graph generation module 303, an optimized directed path generation 304, an inquiry processing module 305, a database interface module 306, and a database 307. Communication module 301 may include software instruction for communicating with other components of system 100 (e.g., user device 120, agent device 130). For example, communication module 301 may be configured to receive a plurality of conversations and the related data. Directed path generation module 302 may include software instruction for generating a directed path for each of the conversations. Directed graph generation module 303 may include software instruction for generating a directed graph based on the directed paths of the conversation. Optimized directed path generation 304 may include software instruction for generating an optimized directed path according to the directed graph. Inquiry processing module 305 may include software instruction for processing a customer inquiry received via, for example, communication module 301, according to the optimized directed path. Database interface module 306 may include software instruction executable to interact with database 307, to store and/or receive information (e.g., conversations, relevant data and/or information, etc.).

Communication module 301 may be configured to facilitate data exchange between the components of system 100. For example, directed path generation module 302 may receive historical conversation data from database 140 through communication module 301. As another example, inquiry processing module 305 may receive a new customer inquiry from a user device associated with a customer through communication module 301.

Directed path generation module 302 may be configured to receive a plurality of conversations (e.g., from database 140). In some embodiments, the conversations include one or more historical conversations between customers and agents (bot or human agent). For example, a conversation may include a transcript of an online chat between a customer and a human agent. In some embodiments, a conversation may also include data relating to one or more actions taken by an agent involved in the conversation. For instance, the conversation may include one or more application program interface (API) calls made by the agent during the conversation. The conversation may further include the information and/or results returned by an API call.

Figure 4A:
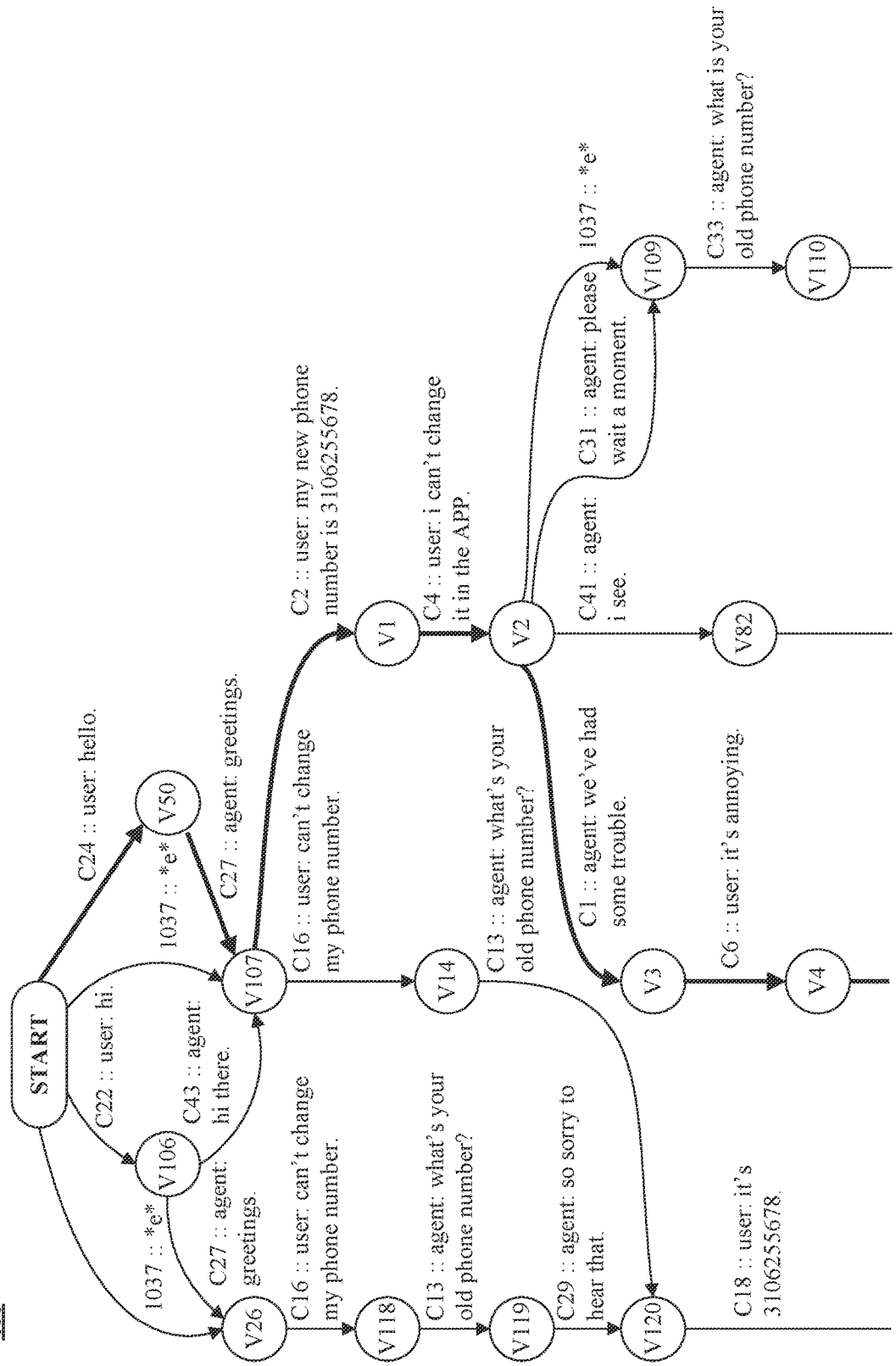
FIGS. 4A-C illustrate an exemplary directed graph of conversations, in accordance with some embodiments of this disclosure.
Figure 4B:
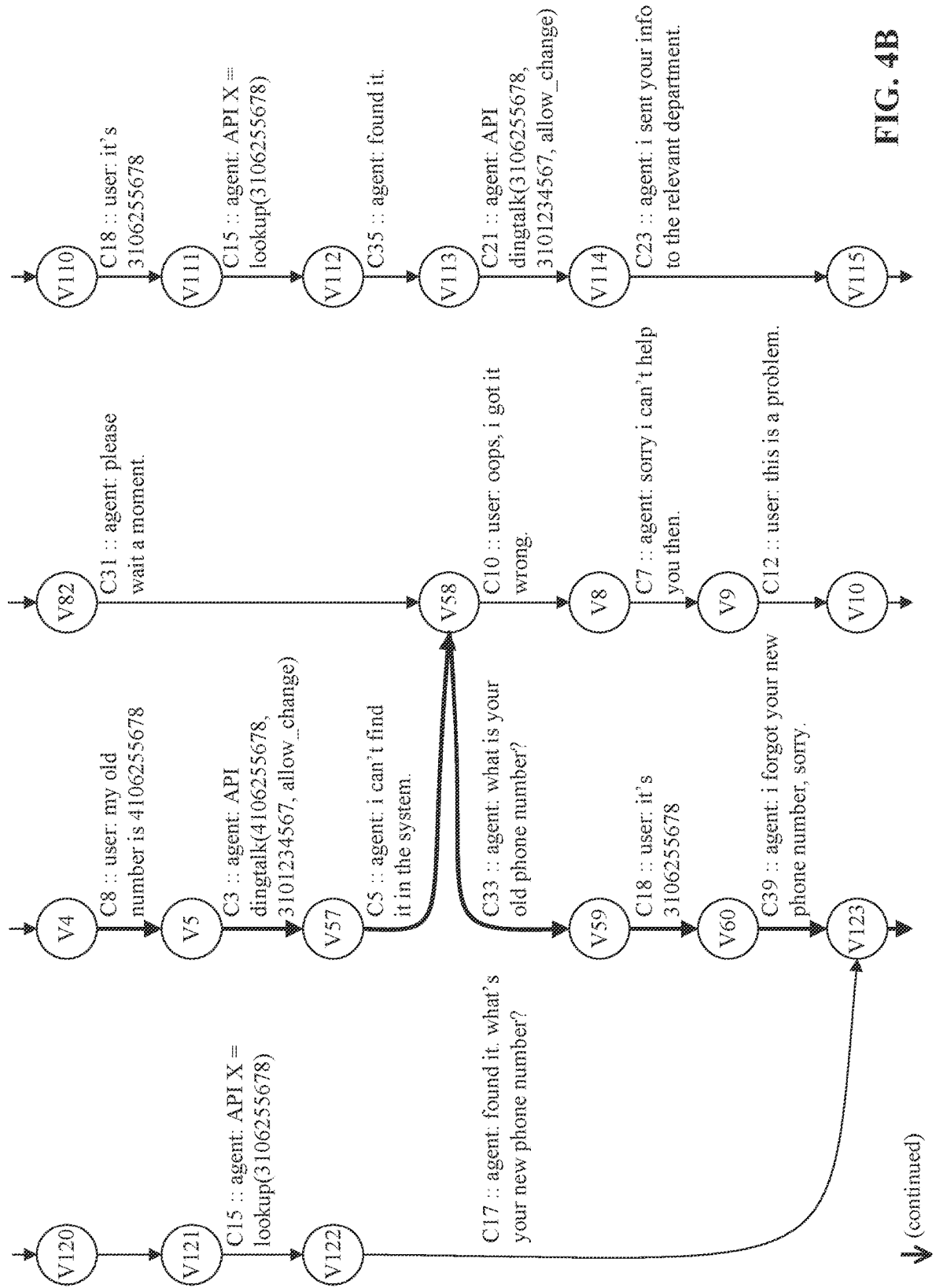
Figure 4C:
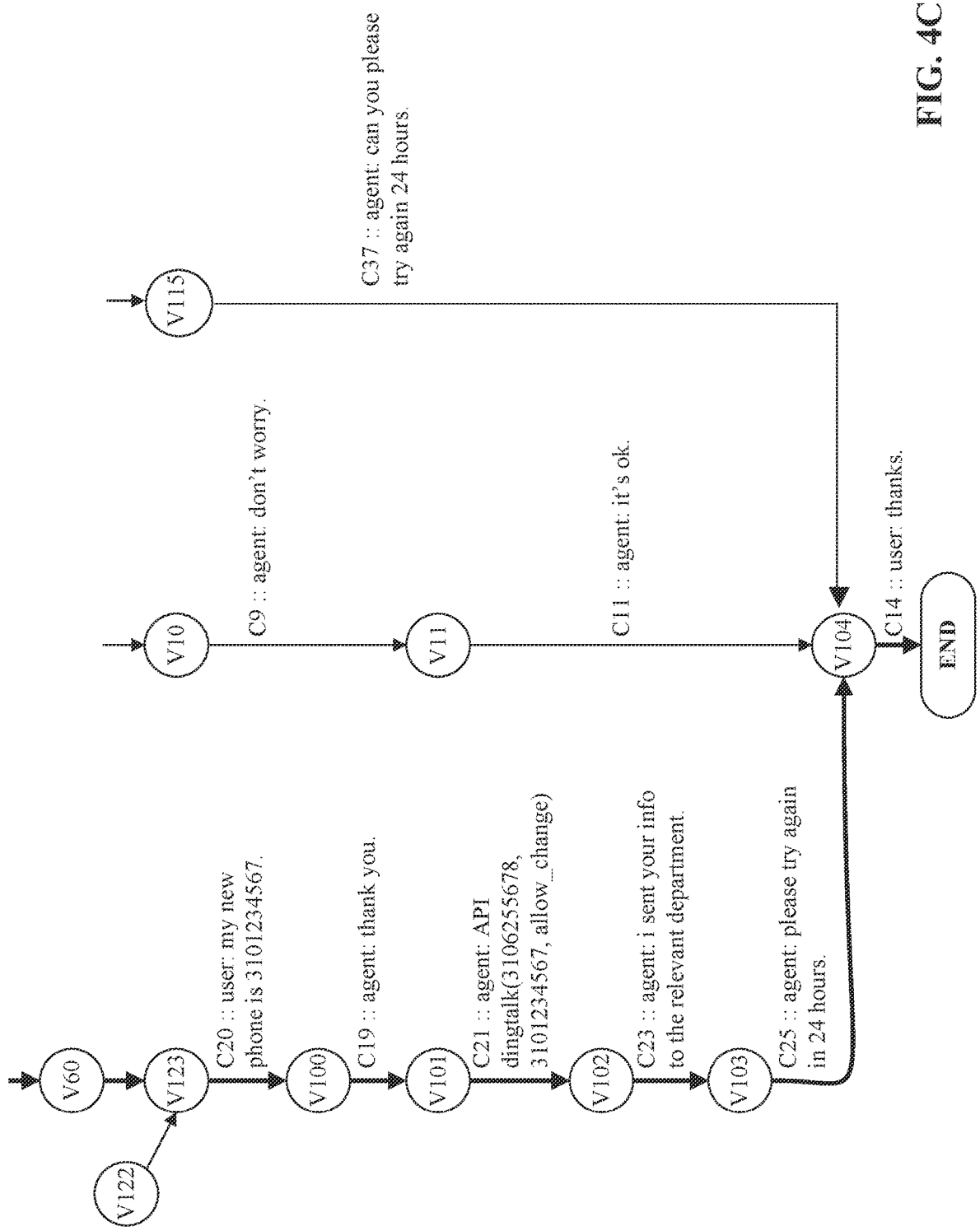

Directed path generation module 302 may also generate a directed path for each of the conversations. FIGS. 4A-4C illustrates an exemplary directed graph 400, which includes a plurality of directed paths generated based on a plurality of exemplary conversations. Each of FIGS. 4A-4C shows an enlarged portion of a directed path as an example. In one embodiment, illustrated in FIGS. 4A-4C, an exemplary conversation may include multiple conversation entries: C24 (user: hello), C27 (agent: greetings), C16 (user: can't change my phone number), C13 (agent: what's your old phone number?), C18 (user: it's 3106255678), C17 (agent: found it, what's your new phone number?), C20 (user: my new phone number is 3101234567), C19 (agent: thank you), C23 (agent: I sent your info to the relevant department), C25 (agent: please try again in 24 hours), and C14 (user: thanks). The conversation may also include one or more actions made by the agent and/or the customer relating to the conversation. For example, the same conversation may include two API calls made by the agent during the conversation: C15 (agent: API X=lookup (3106255678)) for retrieving information relating to the phone number provided by the customer in C18 (user: it's 3106255678) and C21 (agent: API dingtalk(3106255678, 3101234567, allow_change)) for updating the customer's phone number. Directed path generation module 302 may generate a directed path from the start to the end of the conversation based on the conversation entries and/or the API calls involved in the conversation. For example, directed path generation module 302 may generate a plurality of edges (e.g., C #s illustrated in FIGS. 4A-4C), each of which may represent a conversation entry and/or an action made by a party involved in the conversation. Directed path generation module 302 may also determine a plurality of vertices (e.g., V #s illustrated in FIGS. 4A-4C), each of which may represent a state of the conversation, and link the vertices with the edges according to a chronological order (e.g., according to the sequence that the conversation entries and/or actions appear in the conversation). By way of example, as illustrated in FIGS. 4A-4C, for the exemplary conversation discussed above, directed path generation module 302 may generate a directed path including C24, V50, C27, V107, C16, V14, C13, V120, C18 (shown in FIG. 4A), V121, C15, V122, C17, V123 (shown in FIG. 4B), C20, V100, C19, V101, C21, V102, C23, V103, C25, V104, and C14 (shown in FIG. 4C).

Directed graph generation module 303 may be configured to generate a directed graph based on the generated directed paths for the conversations. For example, directed graph generation module 303 may determine a directed graph including all directed paths generated. Alternatively, directed graph generation module 303 may determine one or more common edges and/or one or more common vertices among the directed paths and merge one or more directed paths (as illustrated in FIGS. 4A-4C).

Optimized directed path generation 304 may be configured to determine (and/or generate) an optimized directed path based on the directed graph. For example, optimized directed path generation 304 may determine an optimized directed path passing the fewest vertices (i.e., states of a conversation) according to the directed graph. Alternatively or additionally, optimized directed path generation 304 may determine an optimized directed path based on the frequency of one or more vertices and/or edges that appear in the directed graph. For example, optimized directed path generation 304 may determine a directed path in bold illustrated in FIGS. 4A-4C (i.e., from "START" along vertices V50, V107, . . . , V103, and V104 to "END") as the optimized directed path.

Optimized directed path generation 304 may further save the optimized directed path in a storage device (e.g., database 140 and/or database 307).

Inquiry processing module 305 may be configured to receive a customer inquiry and process the customer inquiry according to the optimized directed path. For example, inquiry processing module 305 may receive a new customer inquiry from a user device associated with a customer. Inquiry processing module 305 may also obtain the optimized directed path from database 307 via database interface module 306. Inquiry processing module 305 may further determine a conversation entry relating to the customer inquiry by a party (the customer or agent). For example, inquiry processing module 305 may receive a conversation entry by the customer including a greeting. Inquiry processing module 305 may also determine a corresponding vertex or edge in the optimized directed path (e.g., C24 or V50) and generate a response based on the determined vertex or edge. By way of example, inquiry processing module 305 may generate a response based on edge C27, which may include a greeting message to the customer.

Database 307 may store data that can accessed by other components of system 100. Database 307 may include a volatile or non-volatile, magnetic, semiconductor, tape, optical, removable, non-removable, or another type of storage device or tangible or non-transitory computer-readable medium. The data stored in database 307 may include data relating to customers and/or agent (e.g., profile information of customers and/or agents), knowledge base, one or more customer inquiry processing models generated as described elsewhere in this disclosure, training samples, historical conversations, or the like, or a combination thereof.

Figure 5:
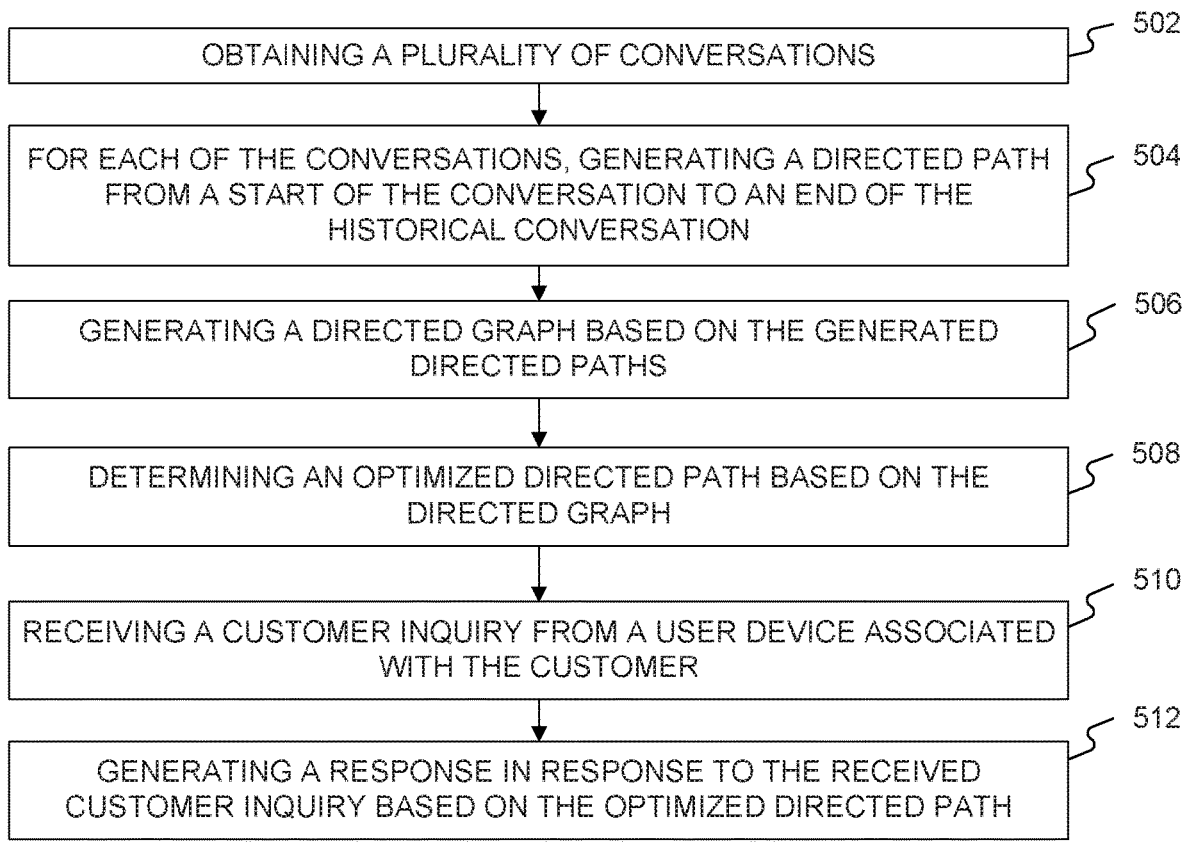
FIG. 5 illustrates a flowchart of an exemplary process for processing a customer inquiry, in accordance with some embodiments of this disclosure.

FIG. 5 is a flowchart showing an exemplary process 500 for processing a customer inquiry. In one embodiment, the steps of process 500 may be performed by server 110 and/or agent device 130.

In 502, communication module 301 may receive a plurality of conversations. The conversation may in the form of a video, a telephonic call, an online chat, an email chain, postings on an online forum, instant messaging, short message service (SMS), multimedia messaging service (MMS), hypertext, file transfer, data exchange, or the like, or a combination thereof. An online chat may occur between the customer and an agent via an application installed in a user device associated with the customer or an online chat tool on a website. In some embodiments, the received conversations may include one or more conversations that occurred in the past (which are also referred to herein as historical conversations).

In some embodiments, a conversation may include a conversation log and an action log. A conversation log may include one or more conversation entries between the customer and the agent. A conversation entry may include a comment and/or question proffered by a party (the customer or agent) during the conversation. An action log may include data relating to one or more actions made by a party (e.g., the customer and/or agent) associated with the conversation. The action(s) included in the action log may include one or more application program interface (API) calls made by a party, file downloading/uploading, program execution at the end of a party, or the like, or a combination thereof. In some embodiments, the action log may further include the information relating to the action. For example, an action log may include one or more application program interface (API) calls made by the agent during the conversation, and may also include the specification and parameters of the API call, the information retrieved, and/or results returned in response to the API call. In some embodiments, the conversation may further include association information of a conversation entry with one or more API calls. For example, U.S. application Ser. No. 16/236,959, filed Dec. 31, 2018, discloses a method of associating a conversation entry with one or more API calls during a conversation, which is incorporated herein by reference in its entirety.

In some embodiments, a conversation log may be generated based on the conversation between a customer and one or more agents. For example, a conversation log may be generated by applying, by system 100, voice recognition to the verbal exchange to obtain a textual transcription of a phone call between a customer and agent. In some embodiments, inconsequential portions of the conversation may be identified and deleted from the conversation, and thus excluded from the conversation log. In some embodiments, a conversation log may include relevant information relating to the conversation. For example, a conversation log may include time information (e.g., timestamps) of conversation entries, the profile and account information of the customer, the profile information of the agent, or the like, or a combination thereof.

In some embodiments, an API log may also include relevant information relating to the API calls. For instance, an API log may include the time information (e.g., timestamps) of the API calls, the information of agent device 130 activating the API calls, the information retrieved in response to an API call, the results of executing an API call, or the like, or a combination thereof. By way of example, an API log may include customer information retrieved in response to a query API call (e.g., API X=lookup ("jack"; "name")) for the customer's profile information. As another example, the API log may also include a result of updating the customer's phone number in response to an operation API call by the agent to update the customer's phone number upon the customer's inquiry. As a further example, the API log may include an error message indicating that no record has been identified in response to an API query call made by the agent for looking up a customer's record.

In some embodiments, an API log may further include one or more identifiers of the context conversation included in a conversation log (and the conversation). Alternatively or additionally, a conversation entry of a conversation log may include one or more identifiers of the corresponding API call(s).

In 504, directed path generation module 302 may generate a directed path for each of the conversations. In one embodiment, illustrated in FIGS. 4A-4C, an exemplary conversation may include multiple conversation entries: C24 (user: hello), C27 (agent: greetings), C16, (user: can't change my phone number), C13 (agent: what's your old phone number?), C18 (user: it's 3106255678), C17 (agent: found it, what's your new phone number?), C20 (user: my new phone number is 3101234567), C19 (agent: thank you), C23 (agent: i sent your info to the relevant department), C25 (agent: please try again in 24 hours), and C14 (user: thanks). The conversation may also include one or more actions made by the agent and/or the customer relating to the conversation. For example, the same conversation may include two API calls made by the agent during the conversation: C15 (agent: API X=lookup (3106255678)) for retrieving information relating to the phone number provided by the customer in C18 (user: it's 3106255678) and C21 (agent: API dingtalk(3106255678, 3101234567, allow_change)) for updating the customer's phone number. Directed path generation module 302 may generate a directed path from the start to the end of the conversation based on the conversation entries and/or the API calls involved in the conversation. For example, directed path generation module 302 may generating a plurality of edges (e.g., C #s illustrated in FIGS. 4A-4C), each of which may represent a conversation entry and/or an action made by a party involved in the conversation. Directed path generation module 302 may also determine a plurality of vertices (e.g., V #s illustrated in FIGS. 4A-4C), each of which may represent a state of the conversation, and link the vertices with the edges according to a chronological order (e.g., according to the sequence that the conversation entries and/or actions appear in the conversation). By way of example, as illustrated in FIGS. 4A-4C, for the exemplary conversation discussed above, directed path generation module 302 may generate a directed path including C24, V50, C27, V107, C16, V14, C13, V120, C18 (shown in FIG. 4A), V121, C15, V122, C17, V123 (shown in FIG. 4B), C20, V100, C19, V101, C21, V102, C23, V103, C25, V104, and C14 (shown in FIG. 4C).

In some embodiments, directed path generation module 302 may standardize the conversation entries and/or one or more API calls of a conversation based on the content of the conversation entries and/or API call(s). Directed path generation module 302 may also determine a plurality of edges based on the standardized conversation entries and/or the standardized one or more API calls. Directed path generation module 302 may also generate a directed path by connecting the determined edges with a plurality of vertices. For example, directed path generation module 302 may standardize greeting messages as a "greeting" edge. By way of example, directed path generation module 302 may standardize greeting messages like "Hi," "Hello," and "How are you?" as a standard greeting message. As another example, directed path generation module 302 may also standardize messages such as "I'd like to change my phone number," "I want to update my number" as a conversation entry of "request to update the phone number." Directed path generation module 302 may also determine a plurality of edges based on these standardized conversation entries and/or standardized one or more API calls. In some embodiments, directed path generation module 302 may standardize one or more conversation entries based on an extraction process according to natural language processing (e.g., based on named-entity recognition (NER)). For example, directed path generation module 302 may identify and segment the named entities included in a conversation entry, and categorize the identified named entities under various predefined classes. Directed path generation module 302 may also standardize the conversation entry by generalizing the conversation entry (e.g., replacing a specific named entity Jack with a name field such as [CUSTOMER_NAME], replacing a specific phone number with a phone number field such as [CUSTOMER_PHONENO1], etc.).

In some embodiments, at least one of the directed paths may be a weighted directed path. A weighted directed path refers to a directed path having at least one vertex or edge that has a weight assigned to it. For example, directed path generation module 302 may determine a weight for a conversation entry or an action made by the agent based on a subsequent response by the customer (which is also a conversation entry). By way of example, the response by the customer may include a message like "Great! That's very helpful." Directed path generation module 302 may assign a favorable weight having a value of, for example, 2, which is greater than the default value (e.g., 1) to the edge corresponding to the conversation entry or the action by the agent (or a corresponding vertex). Alternatively, directed path generation module 302 may assign a favorable weight to all edges and/or vertices of the conversation.

In some embodiments, in determining a weighted directed path, directed path generation module 302 may obtain a feedback from a customer associated with a conversation and determine, based on the obtained feedback, a weighting factor assigned to at least one of the edges of the directed path or at least one of the vertices of the directed path. Directed path generation module 302 may also determine a weighted directed path based on the weighting factor. For example, if the feedback is positive, directed path generation module 302 may determine a favorable weight assigned to the directed path. On the other hand, if the feedback is negative, directed path generation module 302 may determine a less favorable weight assigned to the directed path.

In some embodiments, directed path generation module 302 may transmit instructions to display one or more directed paths in a user interface of agent device 130 and/or server 110. A user of agent device 130 and/or server 110 may modify the directed path(s) via user input. For example, the user may add, delete, and/or update one or more vertices and/or one or more edges via user input. As another example, the user may merge one or more directed paths at one or more vertices and/or one or more edges via user input. The user may save the modified directed path(s) into a storage device for further processing (e.g., continuing step 506 as discussed below).

In 506, directed graph generation module 303 may generate a directed graph based on the directed paths. For example, directed graph generation module 303 may determine a directed graph including all directed paths generated. Alternatively, directed graph generation module 303 may determine one or more common edges and/or one or more common vertices among the directed paths and merge one or more directed paths at the common edge(s) and/or common vertex/vertices (e.g., exemplary directed graph 400 illustrated in FIGS. 4A-4C). In some embodiments, the directed graph may include a directed acyclic graph. In some embodiments, the directed path may include one or more weighted directed paths determined in step 504.

In some embodiments, directed graph generation module 303 may transmit instructions to display the directed graph (or a portion thereof) in a user interface of agent device 130 and/or server 110. A user of agent device 130 and/or server 110 may modify the directed graph via user input. For example, the user may add, delete, and/or update one or more vertices and/or one or more edges via user input. As another example, the user may merge one or more directed paths at one or more vertices and/or one or more edges via user input. The user may save the modified directed graph into a storage device for further processing (e.g., continuing step 508 as discussed below).

In 508, optimized directed path generation 304 may determine an optimized directed path based on the directed graph. An optimized directed path is unnecessary to be a directed path of a specific conversation (although it is possible). An optimized directed path may include vertices and edges from the directed paths of two or more conversations. For example, optimized directed path generation 304 may determine a path from the start to the end that has the fewest edges (and/or vertices) as an optimized directed path. As another example, optimized directed path generation 304 may determine a path passing through the edge (and/or vertex) that appears most frequently in the directed graph as an optimized directed path. For example, optimized directed path generation 304 may determine a vertex (and/or edge) having the most appearances in the directed graph, and determining the optimized directed path based on the determined vertex (and/or edge). In some embodiments, optimized directed path generation 304 may determine the rest of the optimized directed path based on a determined edge (and/or vertex). For example, the optimized directed path may also include at least one of an (immediate or remote) upstream edge (or vertex) or a (remote or immediate) downstream edge (or vertex) of the determined vertex (and/or edge). An upstream edge (or vertex) of a vertex (or edge) refers to an edge (or vertex) that is closer to the start of a conversation than that edge (or vertex), and a downstream edge (or vertex) of a vertex (or edge) refers to an edge (or vertex) that is closer to the end of the conversation than that edge (or vertex).

By way of example, optimized directed path generation 304 may determine a directed path in bold illustrated in FIGS. 4A-4C (i.e., from "START" along vertices V50, V107, . . . , V103, and V104 to "END") as the optimized directed path.

In some embodiments, optimized directed path generation 304 may determine the frequency of the conversation entries and actions made that appear in all conversations (i.e., edges of the directed graph), and determine an optimized directed path based on the frequencies of the conversation entries and actions. For example, optimized directed path generation 304 may determine a path passing through an edge (or a related vertex) that has the highest frequency as an optimized directed path. Optimized directed path generation 304 may also determine a downstream edge (or vertex) of the determined edge to be included in the optimized directed path. Alternatively or additionally, optimized directed path generation 304 may determine a sum of the frequencies of the edges (and/or vertices) and determine a path from the start to the end that has the highest value. Alternatively or additionally, optimized directed path generation 304 may determine a frequency rank for the paths of the directed graph and select a number of paths that have a frequency rank above a predetermined number (e.g., top 3 or 5 paths) as optimized directed paths.

In some embodiments, for a weighted directed path (or a weighted directed graph), when determining an optimized directed path, optimized directed path generation 304 may consider the weight(s) assigned to the directed path (or one or more edges and/or vertices). For example, when determining the popularity of an edge of a weighted directed path, optimized directed path generation 304 may multiply the frequency of the edge with the weight assigned to the edge.

Alternatively or additionally, optimized directed path generation 304 may determine an optimized directed path based on the edges and/or vertices' closeness levels to the end of the corresponding conversation. For example, for each of the vertices of the directed graph, optimized directed path generation 304 may determine a closeness level to the end of the corresponding conversation. By way of example, optimized directed path generation 304 may divide a conversation into 6 levels (e.g., 0-5, 0 representing the start and 5 representing the end of the conversation). Optimized directed path generation 304 may also categorize the conversation entries and/or actions into one of the levels. Optimized directed path generation 304 may further select the most popular edge (and/or vertex) among the edges (and/or vertices) having a same closeness level as one of the edge (and/or vertex) of the optimized directed path. Optimized directed path generation 304 may determine the rest of the optimized directed path based on the determined edge (and/or vertex).

In some embodiments, optimized directed path generation 304 may save the determined optimized directed path(s) into a storage device (e.g., database 140 and/or database 307).

In 510, inquiry processing module 305 may receive a customer inquiry (e.g., a new customer inquiry). For example, communication module 301 may receive a request from a user device 120 associated with a customer via network 150. The request may be in the form of a telephonic call, request for an online chat, email, posting on an online forum, SMS, MMS, or the like, or a combination thereof. Alternatively or additionally, the request may be transmitted to server 110 and/or agent device 130 through an application installed in user device 120.

In 512, inquiry processing module 305 may generate a response to the customer inquiry based on an optimized directed path. For example, inquiry processing module 305 may obtain an optimized directed path from a storage device. Inquiry processing module 305 may also determine an edge or vertex of the optimized directed path based on the customer inquiry (or a conversation entry following the customer inquiry. For example, inquiry processing module 305 may receive a request made by a customer during an online chat to update his or her phone number (e.g., a message "I'd like to change my phone number from 4106255678 to 3101234567"). Inquiry processing module 305 may obtain an optimized directed path illustrated in FIGS. 4A-4C (the path in bold) from database 307. Inquiry processing module 305 may also determine a vertex of the optimized directed path (e.g., vertex V5 shown in FIG. 4C after the user provided the old and new phone numbers) and determine an action or conversation entry to be made by an agent (a bot or human agent) following the vertex. By way of example, inquiry processing module 305 may generate an API call to update the phone number. Inquiry processing module 305 may further generate a response based on the result of the API call (e.g., generating a message transmitted to the customer indicating that the update of the phone number has been completed).

In some embodiments, inquiry processing module 305 may obtain a plurality of optimized directed paths and generate a response based on the optimized directed paths and the customer inquiry. For example, inquiry processing module 305 may obtain a first optimized directed path (e.g., the optimized directed path in bold shown in FIGS. 4A-4C) and a second optimized directed path (e.g., another optimized directed path passing vertices V121 and V122). The customer may only provide an old phone number in a message to the agent. The optimized directed path in bold does not have such a state. Inquiry processing module 305 may select the second optimized directed path and determine a response based on vertex V120 or V121 (or edge C18 or C15). For instance, inquiry processing module 305 may generate and execute an API call to retrieve the information relating the phone number provided by the customer. Inquiry processing module 305 may also generate a response based on the result of the executed API call to retrieve the information (e.g., generating a message to be transmitted to the customer indicating that no record has been found for the phone number).

In some embodiments, inquiry processing module 305 may also receive, from the user device associated with the customer, information relating to the customer inquiry and determine a vertex of the optimized directed path based on the received information. Inquiry processing module 305 may also generate a response based on a downstream edge or vertex of the determined vertex. For example, inquiry processing module 305 may receive a request made by a customer during an online chat to update his or her phone number (e.g., a message "I'd like to change my phone number to 3101234567"). Inquiry processing module 305 may obtain an optimized directed path illustrated in FIGS. 4A-4C (the path in bold) from database 307. Inquiry processing module 305 may also determine a vertex of the optimized directed path (e.g., vertex V5 shown in FIG. 4C after the user provided a new phone numbers) and determine an action or conversation entry to be made by an agent (a bot or human agent) following the vertex (e.g., edge C3). By way of example, inquiry processing module 305 may generate and execute an API call to update the phone number. Inquiry processing module 305 may further generate a response based on the result of the API call (e.g., generating a message transmitted to the customer indicating that the update of the phone number has been completed).

In some embodiments, inquiry processing module 305 may transmit instructions to agent device 130 to display one or more optimized directed paths in a user interface of agent device 130. Alternatively or additionally, inquiry processing module 305 may transmit instructions to agent device 130 to display a directed graph (or a portion thereof) in the user interface. Agent device 130 may also highlight one or more optimized directed paths in the directed graph (e.g., different color, font, size, or the like, or a combination thereof). In some embodiments, the directed graph and/or optimized directed paths may be dynamically modified according to the input of the customer and/or agent. For example, an agent may select one of the edges and/or vertices in the directed graph or optimized directed path(s) via an input device of agent device 130. Inquiry processing module 305 may also automatically generate a response based on the selected edge or vertex. In some embodiments, inquiry processing module 305 may highlight one or more directed paths following the selected edge or vertex so that the agent may have visualization of the conversation that is likely to happen next. This visualization may help a human agent to interpret the information and data during the conversation. As another example, inquiry processing module 305 may receive a conversation entry from the customer and/or information relating to an action by the customer (e.g., uploading a file such as a screenshot by the customer). Inquiry processing module 305 may process the conversation entry and/or information relating to the action, and determine an edge and/or vertex included in the optimized directed path(s) (and/or a directed graph). Inquiry processing module 305 may further automatically generate a suggested response based on the customer's conversation entry and/or action. Agent device 130 may highlight the determined edge and/or vertex in the user interface accordingly. The agent may also modify the response via the input device of agent device 130. The response may be transmitted to the customer via communication module 301.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, e.g., hard disks or CD ROM, or other forms of RAM or ROM, USB media, DVD, Blu-ray, Ultra HD Blu-ray, or other optical drive media.

Computer programs based on the written description and disclosed methods are within the skills of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The examples are to be construed as non-exclusive. Furthermore, the steps of the disclosed methods may be modified in any manner, including by reordering steps and/or inserting or deleting steps. It is intended, therefore, that the specification and examples be considered as illustrative only.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system."

What is claimed is:

1. A system for processing a customer inquiry, comprising:
   one or more processors; and
   one or more data storage devices storing instructions that, when executed, cause the one or more processors to perform operations comprising:
   obtaining a plurality of historical conversations, each of the historical conversations comprising a plurality of conversation entries associated with the each of the historical conversations;
   for each of the historical conversations, generating a directed path from a start to an end of the each of the historical conversations, the directed path comprising a plurality of edges and a plurality of vertices, each of the edges representing a conversation entry or an application program interface (API) call of the each of the historical conversations, each of the vertices representing a state of the each of the historical conversations;
   generating a directed graph based on the generated directed paths, wherein generating the directed graph comprises:
   determining a common vertex between at least two of the directed paths; and
   merging the at least two of the directed paths at the common vertex, wherein the generated directed graph comprises the merged at least two of the directed paths;

determining an optimized directed path based on the directed graph, the optimized directed path comprising a plurality of edges and a plurality of vertices;

receiving a customer inquiry from a user device associated with a customer; and generating a response in response to the received customer inquiry based on the optimized directed path, wherein generating the response comprises:

generating an API call in response to the received customer inquiry based on the optimized directed path;

executing the generated API call; and generating the response based a result of the execution of the API call.

2. The system of claim 1, wherein generating a directed path for each of the historical conversation comprises:

standardizing the conversation entries associated with the each of the historical conversations;

determining a plurality of edges based on the standardized conversation entries; and generating the directed path by connecting the edges with a plurality of vertices according to a chronological order.

3. The system of claim 1, wherein the optimized directed path has the fewest edges from the start to the end.

4. The system of claim 1, wherein determining an optimized directed path based on the directed graph comprises:

determining a vertex having the most appearances in the directed graph; and determining the optimized directed path based on the determined vertex.

5. The system of claim 4, wherein the optimized directed path comprises at least one of an upstream edge or a downstream edge of the determined vertex.

6. The system of claim 4, wherein the optimized directed path comprises at least one of an immediate upstream edge or an immediate downstream edge of the determined vertex.

7. The system of claim 1, wherein determining an optimized directed path based on the directed graph comprises:

determining an edge having the most appearances in the directed graph; and determining the optimized directed path based on the determined edge.

8. The system of claim 7, wherein the optimized directed path comprises at least one of an upstream vertex or a downstream vertex of the determined edge.

9. The system of claim 7 wherein the optimized directed path comprises at least one of an immediate upstream vertex or an immediate downstream vertex of the determined edge.

10. The system of claim 1, wherein determining an optimized directed path based on the directed graph comprises:

for each of the vertices of the directed graph, determining a closeness level to an end of the corresponding conversation;

determining, among vertices having a same closeness level, a vertex having the most appearances; and determining at least one edge of the optimized path based on the determined vertex.

11. The system of claim 1, wherein the operations further comprise:

displaying the optimized directed path in a user interface of a device associated with an agent;

receiving input from the agent; and modifying, based on the input, the optimized directed path.

12. The system of claim 1, wherein generating a response in response to the received inquiry based on the optimized directed path comprises:

receiving, from the user device associated with the customer, information relating to the customer inquiry;

determining a vertex of the optimized directed path based on the received information; and generating the response based on a downstream edge or vertex of the determined vertex.

13. The system of claim 1, wherein the operations further comprise:

determining two or more optimized directed paths; and determining the response in response to the received customer inquiry based on the two or more optimized directed paths.

14. The system of claim 13, determining the response in response to the received customer inquiry based on the two or more optimized directed paths comprises:

receiving, from the user device associated with the customer, information relating to the customer inquiry;

determining a vertex of the two or more optimized directed paths based on the received information; and generating the response based on a downstream edge or vertex of the determined vertex.

15. The system of claim 1, wherein generating a directed path for each of the historical conversations comprises:

determining a weighted directed path as the directed path for at least one of the historical conversations.

16. The system of claim 15, wherein determining the weighted directed path for the at least one of the historical conversations comprises:

obtaining a feedback from a customer associated with the at least one of the historical conversations;

determining, based on the obtained feedback, a weighting factor assigned to at least one of the edges of the directed path or at least one of the vertices of the directed path; and determining the weighted directed path based on the weighing factor.

17. The system of claim 1, wherein at least one of the historical conversations comprises a transcript of a video, a telephonic call, an online chat, an email chain, postings on an online forum, instant messaging, short message service (SMS), or multimedia messaging service (MMS).

18. A computer-implemented method for processing a customer inquiry, comprising:

obtaining a plurality of historical conversations, each of the historical conversations comprising a plurality of conversation entries associated with the each of the historical conversations;

for each of the historical conversations, generating a directed path from a start to an end of the each of the historical conversations, the directed path comprising a plurality of edges and a plurality of vertices, each of the edges representing a conversation entry or an application program interface (API) call of the each of the historical conversations, each of the vertices representing a state of the each of the historical conversations;

generating a directed graph based on the generated directed paths, wherein generating the directed graph comprises:

determining a common vertex between at least two of the directed paths; and merging the at least two of the directed paths at the common vertex, wherein the generated directed graph comprises the merged at least two of the directed paths;

determining an optimized directed path based on the directed graph, the optimized directed path comprising a plurality of edges and a plurality of vertices;

receiving a customer inquiry from a user device associated with a customer; and generating a response in response to the received inquiry based on the optimized directed path, wherein generating the response comprises:

generating an API call in response to the received customer inquiry based on the optimized directed path;

executing the generated API call; and generating the response based a result of the execution of the API call.

19. A non-transitory computer-readable medium storing instructions that, when executed by one or more processors of a system, cause the system to perform operations comprising:

obtaining a plurality of historical conversations, each of the historical conversations comprising a plurality of conversation entries associated with the each of the historical conversations;

for each of the historical conversations, generating a directed path from a start to an end of the each of the historical conversations, the directed path comprising a plurality of edges and a plurality of vertices, each of the edges representing a conversation entry or an application program interface (API) call of the each of the historical conversations, each of the vertices representing a state of the each of the historical conversations;

generating a directed graph based on the generated directed paths, wherein generating the directed graph comprises:

determining a common vertex between at least two of the directed paths; and merging the at least two of the directed paths at the common vertex, wherein the generated directed graph comprises the merged at least two of the directed paths;

determining an optimized directed path based on the directed graph, the optimized directed path comprising a plurality of edges and a plurality of vertices;

receiving a customer inquiry from a user device associated with a customer; and generating a response in response to the received inquiry based on the optimized directed path, wherein generating the response comprises:

generating an API call in response to the received customer inquiry based on the optimized directed path;

executing the generated API call; and generating the response based a result of the execution of the API call.

* * * * *